United States Patent
Ayukawa et al.

(10) Patent No.: US 8,125,203 B2
(45) Date of Patent: Feb. 28, 2012

(54) PFC CONTROLLER, SWITCHING REGULATOR AND POWER SUPPLY CIRCUIT

(75) Inventors: Kazuhito Ayukawa, Tokyo (JP); Tomohiro Tazawa, Tokyo (JP)

(73) Assignee: Renesas Electronics Corporation, Kanagawa (JP)

( * ) Notice: Subject to any disclaimer, the term of this patent is extended or adjusted under 35 U.S.C. 154(b) by 420 days.

(21) Appl. No.: 12/440,737

(22) PCT Filed: Sep. 13, 2007

(86) PCT No.: PCT/JP2007/067807
§ 371 (c)(1),
(2), (4) Date: Mar. 11, 2009

(87) PCT Pub. No.: WO2008/032768
PCT Pub. Date: Mar. 20, 2008

(65) Prior Publication Data
US 2010/0097041 A1      Apr. 22, 2010

(30) Foreign Application Priority Data
Sep. 14, 2006   (JP) .................................. 2006-249928

(51) Int. Cl.
*G05F 1/00* (2006.01)
(52) U.S. Cl. ..................... 323/272; 323/222; 323/283
(58) Field of Classification Search .................. 323/272, 323/222, 283
See application file for complete search history.

(56) References Cited

U.S. PATENT DOCUMENTS

| | | | | |
|---|---|---|---|---|
| 4,384,321 A | * | 5/1983 | Rippel | 363/124 |
| 5,001,620 A | * | 3/1991 | Smith | 363/89 |
| 5,754,071 A | | 5/1998 | Suh | |
| 5,793,191 A | * | 8/1998 | Elmore et al. | 323/272 |
| 5,905,369 A | | 5/1999 | Ishii et al. | |
| 6,091,233 A | * | 7/2000 | Hwang et al. | 323/222 |
| 6,204,650 B1 | | 3/2001 | Shimamori | |
| 7,116,087 B2 | * | 10/2006 | Zhang et al. | 323/272 |
| 7,205,752 B2 | * | 4/2007 | Jansen | 323/272 |
| 7,592,791 B2 | * | 9/2009 | Emira | 323/283 |
| 7,884,588 B2 | * | 2/2011 | Adragna et al. | 323/272 |
| 7,933,132 B2 | * | 4/2011 | Bridge et al. | 363/65 |

FOREIGN PATENT DOCUMENTS

| | | |
|---|---|---|
| JP | 9-23143 A | 1/1997 |
| JP | 10-146049 A | 5/1998 |
| JP | 11-178326 A | 7/1999 |
| JP | 11-272344 A | 10/1999 |
| JP | 2001-178122 A | 6/2001 |

* cited by examiner

*Primary Examiner* — Shawn Riley
(74) *Attorney, Agent, or Firm* — Mattingly & Malur, PC

(57) ABSTRACT

A PFC counter which controls a switching element of voltage step-up chopper circuits arranged in parallel has a circuit (SLOG) generating a switch signal (GD_S) whose phase is shifted from that of a switch signal of one of the switching elements. This circuit has a first counter (COUNTM) which counts clock signals by a cycle unit of one of the switch signals; a second counter (COUNTS) which counts clock signals by a cycle unit having a predetermined phase difference with respect to one of the switch signals; and a first register (REG1) which holds a value counted by the first counter corresponding to a high-level period of one of the switch signals.

21 Claims, 10 Drawing Sheets

PFC CONTROLLER, SWITCHING REGULATOR AND POWER SUPPLY CIRCUIT

TECHNICAL FIELD

The present invention relates to a PFC (Power Factor Correction) controller applied to an interleaved switching regulator (a voltage step-up converter) and, moreover, to a technology effective in being applied to a switching regulator and a power supply circuit

BACKGROUND ART

A switching regulator such as a voltage step-up converter has a voltage step-up chopper circuit in which a switching element is coupled to a series node of an inductor and a diode. When the switching element is turned on, energy is accumulated in the inductor by a current supplied from a rectifier circuit. Also, when the switching element is turned off, a smoothing capacitance is charged by the energy accumulated in the inductor through the diode. A voltage step-up operation is performed by repeating this operational cycle. In this regard, a PFC controller controls an-on duty of the switching element, for example, by comparing a correlation value between a divided voltage of the voltage obtained in the smoothing capacitance and the amount of an AC input voltage rectified by the rectifier circuit with a triangular wave formed in its internal oscillator, and the PFC controller keeps the stepped-up voltage at a constant level and performs a control to allow the AC input current to be close to a sine wave.

Patent Documents 1 and 2 disclose a technology for an interleaved switching regulator which comprises plural voltage step-up chopper circuits in which switch control is performed by shifting phases of switching elements of respective voltage step-up chopper circuits. In Patent Document 1, a pair of capacitance elements which are charged and discharged complementarily for timing generation to shift phases. In Patent Document 2, when generating timing for shifting the phases, a triangular-wave signal and a corresponding threshold value are used.

[Patent Document 1] Japanese Unexamined Patent Publication No. Hei 10 (1998)-146049
[Patent Document 2] Japanese Unexamined Patent Publication No. 2001-178122

DISCLOSURE OF THE INVENTION

Problem to be Solved by the Invention

However, the technology of Patent Document 1 is complicated and its scale of circuit is large. Further, overall accuracy of its operation tends to be influenced by the process variation of a capacitance element. The technology of Patent Document 2 is also complicated and its scale of circuit is large. Moreover, although it can control the on-duty of a switching element, it is inapplicable to the control for varying an on-off operation frequency of the switching element.

An object of the present invention to provide a PFC controller whose scale of circuit is small and whose overall accuracy of operation is not greatly influenced by process variation and to provide a switching regulator using the PFC controller and a power supply circuit.

Another object of the present invention is to provide a PFC controller which can deal with a control for varying the on-off operation frequency of the switching element and to provide a switching regulator using the PFC controller and a power supply circuit.

The aforementioned and the other objects and novel features of the present invention will become apparent from the description of this specification and the accompanying drawings there of.

Means for Solving the Problem

The typical inventions of the invention disclosed in the present application will be briefly described below.

[1]<PFC Controller>

The PFC controller (PCF_CONT, PCF_CONT_2 (PCF_CONT_1)) according to the present invention is a semiconductor integrated circuit which controls switching elements (M1, M2 (M2, M3, M4)) of plural respective voltage step-up chopper circuits provided in parallel between an input terminal (Ni) and an output terminal (Vout). The PFC controller comprises: a first circuit (CONT1) which generates one of switch control signals (GD_M) for one of the switching elements (M1) in one of the voltage step-up chopper circuits; and a second circuit (CONT 2 (CONT2_1) which generates other switch control signals (GD_S (GD_S_1 to GD_S_3)) whose phases are shifted from a phase of one of the switch control signals for the other switching elements (M2 (M2, M3, M4)) in the other voltage step-up chopper circuit. The second circuit comprises: a first counter (COUNTM) which counts clock signals by a cycle unit of one of the switch control signals; a second counter (COUNTS) which counts clock signals by a cycle unit having a phase shifted from that of one of the switch control signals by a predetermined phase difference; and a first register (REG1) which holds a value counted by the first counter corresponding to a period of a first-level state of one of the switch control signals. When the second counter starts counting, the other switching control signal turns on the other switching element. Further, it turns off the other switching element with timing in which the value counted by the second counter matches the value held in the first register.

Between the input terminal and the output terminal, plural voltage step-up chopper circuits are arranged in parallel. Since the switching elements of the voltage step-up chopper circuits arranged in parallel are switched by different phases, the current flowing per one switching element becomes small and the current peak which flows in each voltage step-up chopper circuit becomes small. Consequently, the harmonic component produced by the switch operation of the switching element can be made small. Furthermore, since the rated current per switching element can be also made small, it becomes possible to adopt an inexpensive switching element. Thus, a composite current ripple becomes small and an input filter circuit can be compact, contributing to cost reduction. Furthermore, the control using a clock value counted by the counter is performed on both the phase difference between a phase of one of the switching elements and that of on-operation timing of the other switching element and the control of the on-duty of the other switching element. Therefore, if the on-duty and frequency of one of the switch control signals are variable, on-duty and frequency of the other switch control signal become variable accordingly. Moreover, since the control using the clock value counted by the counter simplifies the circuit configuration and the overall accuracy of operation performed accordingly is not greatly changed by process variation, high reliability can be achieved.

<Variable Control of Duty and Frequency>

As one specific aspect of the present invention, the first circuit generates one of the switch control signals such that the on-period and turn-on timing of one of the switching elements are determined according to a state of a stepped-up voltage obtained at the output terminal. In short, the first circuit controls the on-duty and frequency of one of the switch control signals in a variable manner.

<Critical Mode>

As another specific aspect of the present invention, the first circuit generates one of the switch control signals such that the on-period of one of the switching elements becomes shorter as the stepped-up voltage obtained at the output terminal comes closer to a target level and that the turn-on timing of one of the switching elements is determined in response to detection of a zero current of an inductor in a voltage step-up chopper circuit corresponding to one of the switching elements. The switch operation of one of the switching element can be performed in what is called a critical mode, and a variable control of the on-duty and frequency of the switching element with respect to the switch control signal can be performed.

<Guarantee of Critical Mode on the Side of Other Switching Elements>

As a further specific aspect of the present invention, the second circuit performs a turn-on control of the other switching element with an additional condition of detecting a zero current of an inductor in the voltage step-up chopper circuit corresponding to the other switching element. When this condition is not added, even if the current which flows in the inductor on the side of other switching elements is not zero, the other switching element is turned on. If so, an operation on the side of the other switching element will deviate from the operation in the critical mode. As a result, all the currents generated by the energy accumulated in the inductor are not used for the voltage step-up operation and part of the currents will be wastefully discharged through the switching element, lowering the voltage step-up efficiency.

<Restart>

As a still further specific aspect of the present invention, the first circuit forcefully turns on one of the switching elements in response to a count-up of the first counter in the second circuit. When starting a voltage step-up operation in the critical mode, even if the internal node is at an unstable level such as floating and the current in the inductor does not become zero easily, an occurrence of the case where a switch operation of one of the switching elements cannot be started can be prevented.

<Configuration of Second Circuit>

As a still further specific aspect of the present invention, other than the first and second counters and the first register, the second circuit comprises: a second register (REG2) which holds a value counted by the first counter in response to a predetermined phase difference to one of the switch control signals; a first detector (DTC1) which detects timing in which the value counted by the first counter matches the value held in the second register; and a second detector (DTC2) which detects timing in which the value counted by the second counter matches the value held in the first register. The second counter counts the clock signals from an initial value for each detection timing by the first detector. The second circuit turns on the other switching element with the match timing by the first detector, and turns off the other switching element with the match timing by the second detector.

As a still further specific aspect of the present invention, in the case of the PFC controller used for a switch control of two voltage step-up chopper circuits arranged in parallel, the second circuit comprises a set of the second counters as well as a set of the first counter and the first register.

As a still further aspect of the present invention, in the case where the PFC controller is used in the switching control of four voltage step-up chopper circuits arranged in parallel, one of the switching elements is a single switching element (M1) and the other switching elements are three switching elements (M2, M3, M4). The second circuit comprises three sets of the second counters as well as a set of the first counter and the first register. The second counters count clock signals by cycle units having respective different predetermined phase differences with respect to one of the switch control signals. Further, each of the second counters turns on the corresponding other switching element when it starts counting. Moreover, the second counter turns off the corresponding other switching element with timing in which the value counted by the second counter matches the value held in the first register.

[2]<Switching Regulator>

The switching regulator of the present invention has a PFC controller as follows. That is, the PFC controller has plural series circuits of inductors and diodes arranged in parallel between an input terminal which receives an output of a rectifier circuit and an output terminal. The PFC controller steps up a voltage at the input terminal and outputs it to the output terminal by driving plural switching elements coupled to a connection node of respective inductors and diodes by different phases. Thus, the PFC controller controls the switching operation of the plural switching elements. A PFC controller similar to the one described earlier is adopted as the PFC controller. Accordingly, as described above, the harmonic component produced by the switch operation of the switching element can be made small. Further, the composite current ripple becomes small, and an input filter circuit can also be compact. Moreover, it contributes to cost reduction. Furthermore, if the on-duty and frequency of one of the switch control signal are variable, on-duties and frequencies of other switch control signals become variable accordingly. Moreover, the circuit configuration is simple, achieving high reliability in its operation.

In addition to the first counter, a first counter, and a first register, for the second circuit of the PFC controller, there are employed: a second register which holds a value counted by the first counter in response to a predetermined phase difference to one of the switch control signal; a first detector which detects timing in which the value counted by the first counter matches the value held in the second register; and a second detector which detects timing in which the value counted by the second counter matches the value held in the first register. The second counter counts the clocks from an initial value for each detection timing by the first detector. The second circuit turns on the other switching element with the match timing by the first detector and turns off the other switching element with the match timing by the second detector.

For example, in the case of a switching regulator in which there are provided two series circuits of inductors and diodes arranged in parallel and two switching elements coupled to the connection node of respective inductors and diodes and in which a voltage of the input terminal is stepped up and outputted to the output terminal when the two switching elements are driven by different phases, the second circuit comprises a set of the second counter and first and second detectors of a second register as well as a set of the first counter and the first register.

Moreover, in the case of a switching regulator in which there are provided four series circuits of inductors and diodes arranged in parallel and four switching elements coupled to the connection node of respective inductors and diodes and in which a voltage of the input terminal is stepped up and outputted to the output terminal when the four switching elements are driven by different phases, one of the switching elements is a single switching element and the other switching elements are three switching elements. Further, the second circuit comprises: a set of the first counter and the first register; and three sets of the second counter, and first and second detectors of the second register. The second counters count clock signals by cycle units having respective different predetermined phase differences with respect to one of the switch control signals.

[3]<Power Supply Circuit>

A power supply circuit according to the present invention comprises: a rectifier circuit which rectifies in response to an AC power supply; an input terminal which receives an output of the rectifier circuit; an output terminal; plural series circuits of inductors and diodes coupled in parallel between the input terminal and the output terminal; plural switching elements coupled to the connection node of respective inductors and diodes; and a controller which steps up a voltage of the input terminal and outputs it to the output terminal by controlling the respective switching elements by different phases. The controller comprises: a first circuit which generates a first switch control signal for the first switching element and a second circuit which generates the other switch control signal whose phase is shifted from that of the switch control signal generated in the first circuit for the other switching element among the plural switching elements. The second circuit comprises: a first counter which counts clock signals by a cycle unit of the first switch control signal; a first register which holds a value counted by the first counter corresponding to a period of a first-level state of one of the switch control signals; a second register which holds a value counted by the first counter in response to a predetermined phase difference with respect to one of the switching control signals; a first detector which detects timing in which the value counted by the first counter matches the value held in the second register; a second counter which counts the clocks from an initial value for each detection timing by the first detector; and a second detector which detects timing in which the value counted by the second counter matches the value held in the first register. The second circuit turns on the other switching element with the match timing by the first detector and turns off the other switching element with the match timing by the second detector. Consequently, as described above, the harmonic component caused by the switching operation of the switching elements can be made small. Also, it contributes to cost reduction. Furthermore, if the on-duty and frequency of one of the switch control signals are variable, on-duties and frequencies of other switch control signals become variable accordingly. Moreover, the circuit configuration is simple and high reliability in its operation can be achieved.

Effect of the Invention

The effects of the typical inventions disclosed in the present application are as follows.

That is, there are provided a PFC controller whose scale of circuit is small and whose overall accuracy of operation is not greatly influenced by process variation, and a switching regulator using the PFC controller and a power supply circuit.

Moreover, there are provided a PFC controller which can deal with a control to vary the on-off operation frequency of the switching element, a switching regulator using the PFC controller, and a power supply circuit.

DESCRIPTION OF REFERENCE CHARACTERS

1 Power supply circuit
RECT Full-wave rectifier circuit
SWRG, SWRG_1, SWRG_2 Switching regulator
AC AC power supply
Nin Input terminal of switching regulator SWRG
Vout Output terminal of switching regulator SWRG
L1, L2 Inductor
D1, D2 Diode
GND Ground point
M1, M2 Switch MOS transistor
Cout Smoothing capacitance
PFC_CONT, PFD_CONT_1, PFC_CONT_2 PFC controller
GD_M, GD_S, GD_S_1 to GD_S_3 Switch control signal
Rf1, Rf2 Feedback resister
Tr1, Tr2 Transformer
ZCDC1 Comparator
ZCDM Induced voltage
Vzcd Reference voltage
ZCDOUT1 Detection signal
FF1 to FF6 Flip-flop
Vfb Feedback voltage
ERAMP Error amplifier
CONT1, CONT1_1 First circuit
CONT2, CONT2_1 Second circuit
SLOG Slave logic
SLOG_1 to SLOG_3 Logic
COUNTM First counter (Master cycle counter)
COUNTS Second counter (Slave on-time counter)
REG1 First register (Master on-time register)
REG2 Second register (Master half-cycle register)
DTC1 First detector
DTC2 Second detector
CLK Count clock signal
DEL Delay circuit
INV Inverter

BEST MODE FOR CARRYING OUT THE INVENTION

Figure 1:
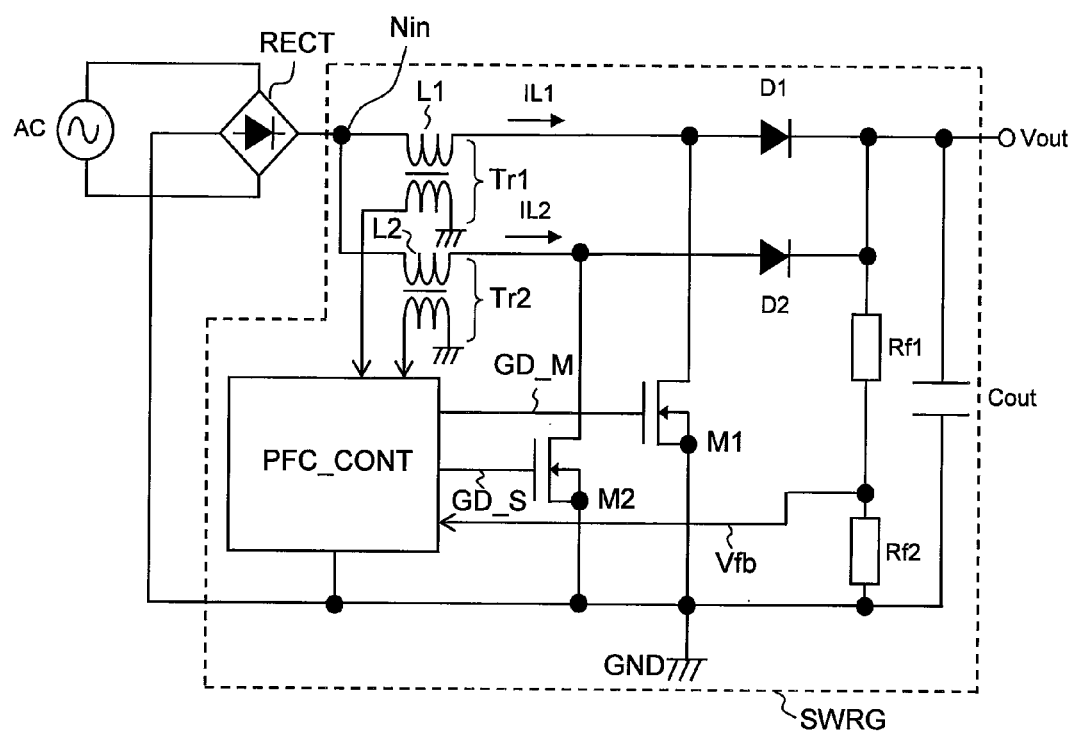
FIG. 1 is a circuit diagram showing an example of a power supply circuit of the present invention.

FIG. 1 shows an example of a power supply circuit according to the present invention. The power supply circuit shown in FIG. 1 is a voltage step-up converter by use of PFC control. The power supply circuit 1 comprises: a full-wave rectifier circuit RECT coupled to an AC power supply AC such as a commercial power; and a switching regulator SWRG. The full-wave rectifier circuit RECT comprises a bridge circuit which uses four diodes. In the full-wave rectifier circuit RECT, a common cathode of two diodes which receives the AC power supply AC at an anode is coupled to an input terminal Nin of the switching regulator SWRG. In the full-wave rectifier circuit RECT, a common anode of two diodes which receive an AC power supply AC at the cathode is a ground point GND of the switching regulator SWRG.

The Switching regulator SWRG has a master voltage step-up chopper circuit and a slave voltage step-up chopper circuit arranged in parallel between the input terminal Nin and an output terminal Vout. The master voltage step-up chopper circuit has a series circuit of an inductor L1 and a diode D1 arranged between the input terminal Nin and the output terminal Vout. Further, the master voltage step-up chopper circuit has an n-channel MOS transistor M1 arranged between the series connection node and the ground point GND. The slave voltage step-up chopper circuit has a series circuit of an inductor L2 and a diode D2 arranged between the input terminal Nin and the output terminal Vout. An n-channel MOS transistor M2 is arranged between the series connection node and the ground point GND. A smoothing capacitance Cout is provided between the output terminal Vout and the ground point GND. The switch control of the MOS transistors M1 and M2 is performed by switch control signals GD_M and GD_S which are outputted from the PFC controller PFC_CONT. The inductor L1 (L2) accumulates energy according to the current supplied from the full-wave rectifier circuit RECT in the on state of the MOS transistor M1 (M2). The smoothing capacitance Cout is charged by a current IL1 (IL2) which flows through the diode D1 (D2) from the energy accumulated in the inductor L1 (L2) in the off state of the MOS transistor M1 (M2). By repeating this operation cycle, the voltage step-up operation is performed, and a smoothed output voltage is obtained at the output terminal Vout. At this time, the PFC controller PFC_CONT monitors a voltage of the output terminal Vout by use of a voltage (feedback voltage) divided by feedback resisters Rf1 and Rf2. At the same time, the PFC controller PFC_CONT detects the presence or absence of a current which flows in the inductor L1 through a secondary coil of a transformer Tr1 which uses the inductor L1 as a primary coil. Similarly, the PFC controller PFC_CONT detects the presence or absence of a current which flows in the inductor L2 through a secondary coil of a transformer Tr2 which uses the inductor L2 as a primary coil. Based on such inputs etc., the PFC controller PFC_CONT generates a switch control signal GD-M which controls the on-duty of the MOS transistor M1 in a critical mode. At the same time, the PFC controller PFC_CONT keeps the stepped-up voltage constant by generating a switch control signal GD_S whose phase is shifted from that of the switch control signal GD_M, and performs a control for allowing an AC input current to be close to a sine wave. In particular, when generating the switch control signal GD_S having a phase difference to a switch control signal GD_M, the PFC controller PFC_CONT uses a digital logic circuit mainly comprising a counter and a register.

Figure 2:
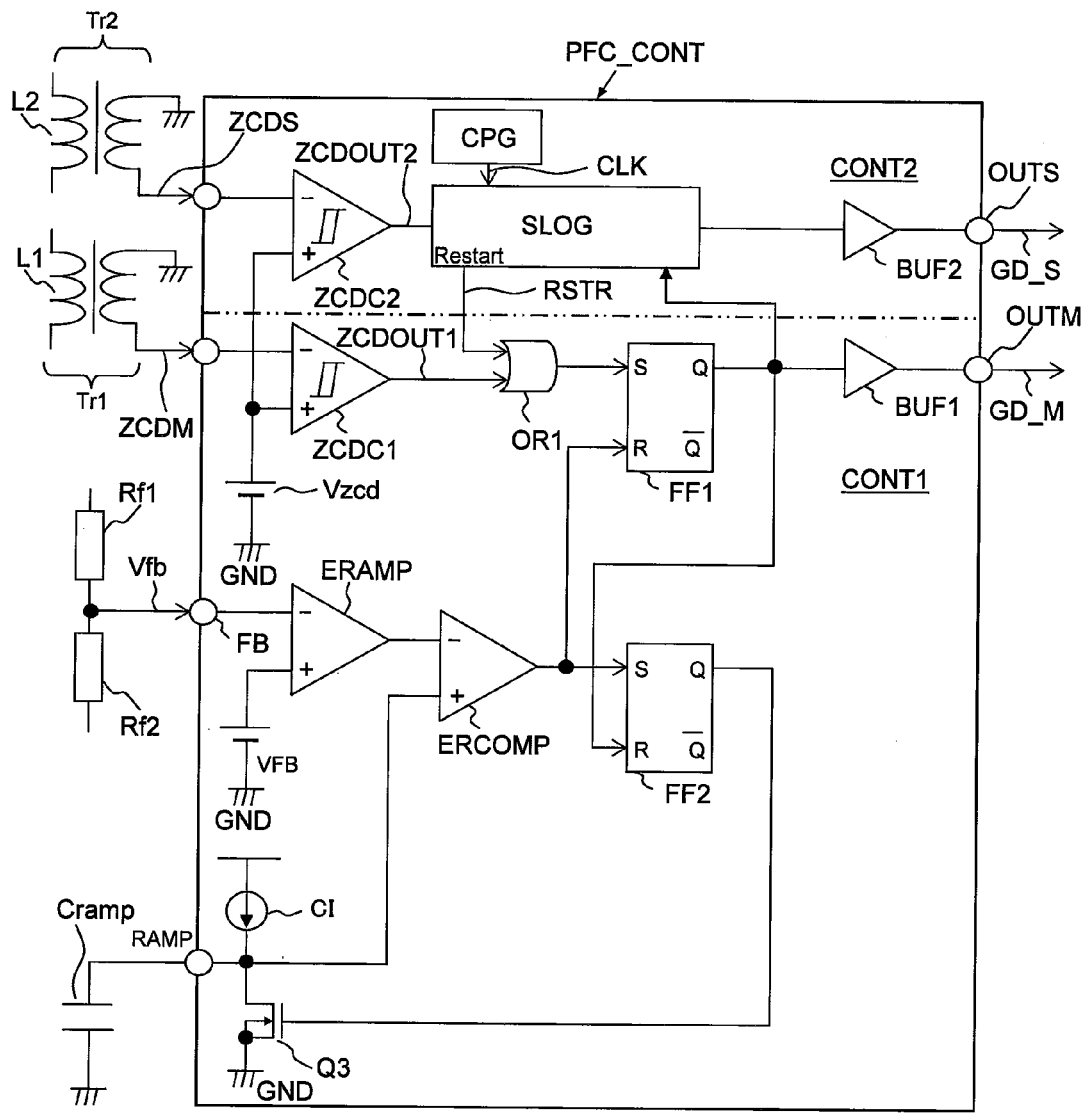
FIG. 2 is a circuit diagram illustrating a general configuration of a PFC controller adopted in the power supply circuit of FIG. 1.

FIG. 2 illustrates a general configuration of the PFC controller PFC_CONT. The PFC controller PFC_CONT is roughly divided into a first circuit CONT1 which generates a switch control signal GD-M of a master voltage step-up chopper circuit and a second circuit CONT2 which generates a switch control signal GD-S for a slave voltage step-up chopper circuit whose phase is shifted from that of the switch control signal GD-M.

The first circuit CONT1 has a comparator ZCDC1 which detects presence or absence of a current flowing in the inductor L1 through the secondary coil of the transformer Tr1. The comparator ZCDC1 receives an induced voltage ZCDM generated by the secondary coil of the transformer Tr1. When the induced voltage ZCDM is lower than a reference voltage Vzcd, the comparator ZCDC1 outputs a high-level detection signal ZCDOUT1. The high-level output ZCDOUT1 of the comparator ZCDC1 sets a flip-flop FF1 through an OR gate OR1. An output Q of the flip-flop FF1 is outputted from the output terminal OUTM through a buffer BUF1 as the switch control signal GD_M. When the flip-flop FF1 is set, the MOS transistor M1 is set to an on-state by the high-level switch control signal GD_M. During that period, a current flows in the inductor L1 through the MOS transistor M1, and energy is accumulated in the inductor L1. At this time, the high-level output Q of the flip-flop FF1 in the set state resets a flip-flop FF2. The reset flip-flop FF2 cuts off an n-channel discharge MOS transistor Q3.

A rated power supply C1 is coupled to the discharge MOS transistor Q3 in series. By a capacitance element Cramp coupled to the series node RAMP as an external element, a ramp voltage which increases linearly is formed. The ramp voltage is compared with the output of an error amplifier ERAMP which amplifies the feedback voltage Vfb inputted from a terminal FB by a comparator ERCMP. The greater the feedback voltage Vfb becomes with respect to the reference voltage VFB, the smaller the output of the error amplifier ERAMP is made. The flip-flop FF2 is set when the gradually increasing ramp voltage exceeds the output voltage of the error amplifier ERAMP, and the flip-flop FF1 is reset. When the flip-flop FF2 is set, the MOS transistor Q3 is turned on, and the ramp voltage is discharged to the ground voltage GND. When the flip-flop FF1 is reset, the switch control signal GD_M is inverted to a low level, and the MOS transistor M1 is cut off. When the MOS transistor M1 is cut off, there flows in the diode D1 a current IL1 corresponding to the energy accumulated in the inductor L1 while the MOS transistor M1 is being turned on, and the smoothing capacitance Cout is charged. When the current becomes zero, the output of the comparator ZCDC1 becomes high-level, the MOS transistor M1 is turned on again by the switch control signal GD_M, and the above cycle is repeated. The closer the stepped-up voltage of the output terminal Vout comes to a target level, the more the first circuit CONT1 shortens the on-period of the MOS transistor M1. Further, in response to the detection of a zero current in the inductor L1, the first circuit CONT1 determines turn-on timing of the MOS transistor M1 and controls the on-duty and frequency of the switch control signal GD_M.

The second circuit CONT2 comprises: a slave logic SLOG having a counter, a register, etc.; a clock pulse generator CPG which generates a count clock signal CLK for the counter; and a comparator ZCDC2. The comparator ZCDC2 receives an induced voltage ZCDS generated by the secondary coil of the transformer Tr2. When the induced voltage ZCDS becomes lower than the reference voltage Vzcd, the comparator ZCDC2 outputs a high-level detection signal ZCDOUT2.

Figure 3:
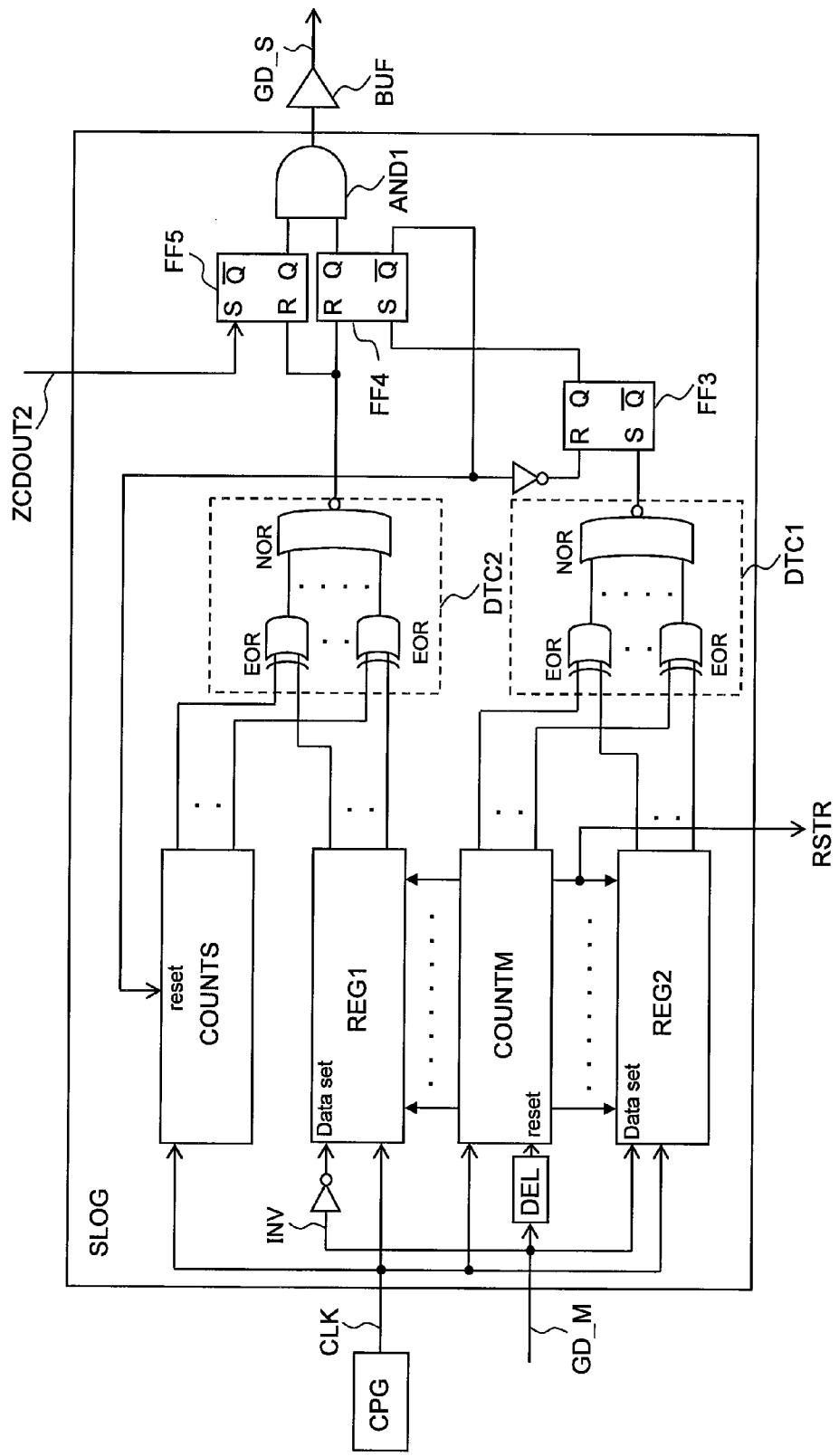
FIG. 3 is a block diagram of a slave logic adopted in the PFC controller of FIG. 2.

FIG. 3 illustrates a block diagram of the slave logic SLOG. The slave logic SLOG comprises: a first counter (master cycle counter) COUNTM; a second counter (slave on-time counter) COUNTS; a first register (master on-time register) REG1; a second register (master half-cycle register) REG2; a first detector DTC1; a second detector DTC2; flip-flops FF3 to FF5; and an AND gate AND1. The master cycle counter COUNTM counts count clock signals CLK, and the counted value is reset by a cycle unit of the master switch control signal GD_M. That is, the master cycle counter COUNTM counts the count clock signals CLK by the cycle unit of the master switch control signal GD_M. Although not particularly limited, the cycle of the count clock signal CLK is 15 MHz and the cycle of the master switch control signal GD_M is 200 to 40 kHz. The master on-time register REG1 holds a value counted by the master cycle counter COUNTM in synchronization with the variation timing from a high-level to a low-level of the master switch control signal GD_M. That is, the master on-time register REG1 holds the value counted by the master cycle counter COUNTM corresponding to the high-level period of the master switch control signal GD_M (on-operation period of the MOS transistor M1). The master half-cycle register REG2 holds the value counted by the master cycle counter COUNTM in response to the half cycle of the master switch control signal GD_M. For example, it is enough for the master half-cycle register REG2 to just hold the value made by shifting the value counted by the master cycle counter COUNTM to a lower-order side by one bit. The first detector DTC1 sets the flip-flop FF3 by detecting timing in which the value counted by the master cycle counter COUNTM matches the value held in the master half-cycle register REG2. As a result, by further setting a flip-flop FF4, the first detector DTC1 turns on the switch control signal GD_S through the AND gate AND1 and a buffer BUF2. The flip-flop FF3 is reset according to the set state of the flip-flop FF4. By counting the count clock signals CLK from an initial value for each detection timing (for each setting of the flip-flop FF4) by the first detector DTC1, the slave on-time counter COUNTS counts the count clock signals CLK by a cycle unit having a phase difference of a half-cycle with respect to the master switch control signal GD_M. By detecting the match timing of the value counted by the slave on-time counter COUNT and the value held in the master on-time register REG1, the second detector DTC2 resets the flip-flop FF4 and turns off the switch control signal GD_S. Thereby, the slave logic circuit SLOG can generate a slave switch control signal GD_S of the same waveform that has a phase difference of a half cycle to the master switch control signal GD_M whose on-duty and frequency are controlled.

FIG. 3 shows a delay circuit DEL which represents a logic element in which the logic element guarantees that the master cycle counter COUNTM is reset after setting the counted value of the master cycle counter COUNTM in the master half-cycle register REG2 in synchronization with a change in starting-up of the switch control signal GD_M. An inverter INV represents a logic element for showing that in synchronization with falling variation of the switch control signal GD_M, a counted value by the master cycle counter COUNTM is set in the master on-time register REG1.

Figure 4:
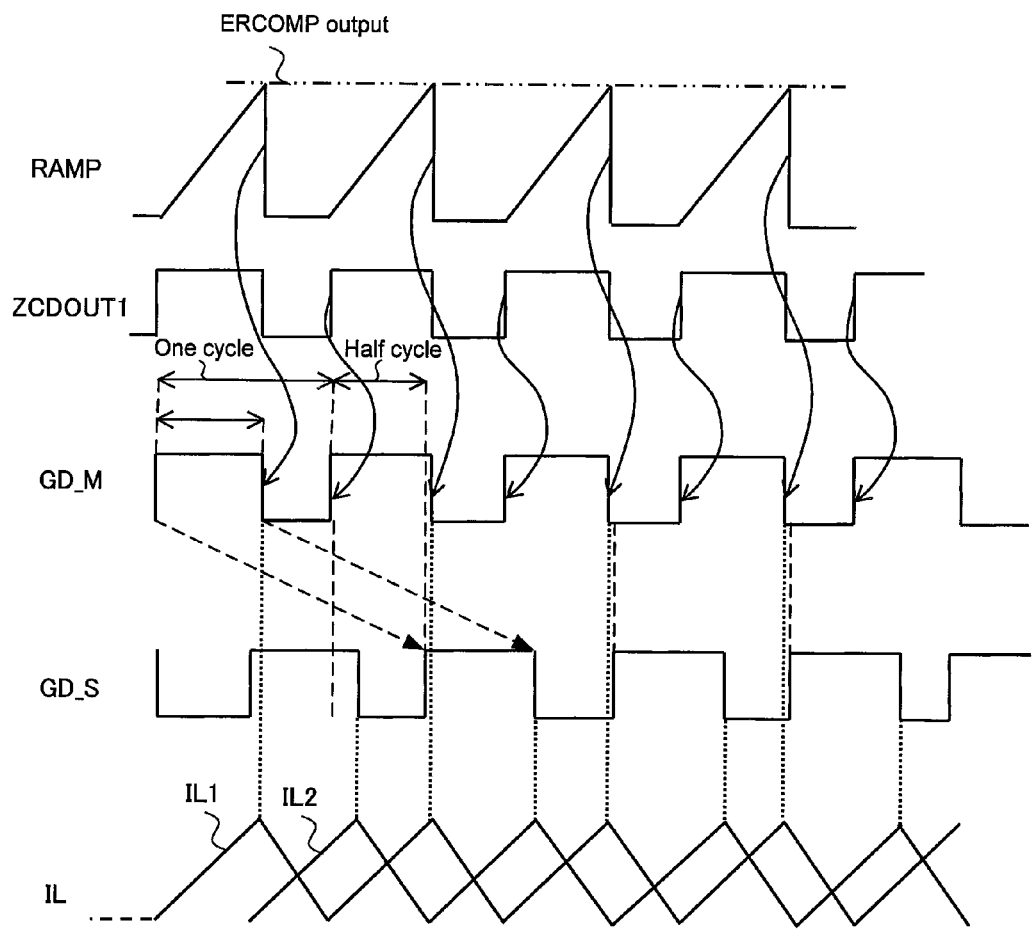
FIG. 4 is a waveform chart showing the wave of an operation by the PFC controller of FIG. 2.

As shown in FIG. 4, the switch control signal GD_S formed earlier is delayed by a half cycle of the switch control signal GD_M. Accordingly, phases of a current peak flowing in the inductor L2 and a current peak flowing in the inductor L1 are also shifted to be made smaller. Therefore, the rate of change in a current which flows in the rectifier circuit RECT becomes small, and the harmonic component given to the AC power supply AC can be reduced. The configuration of the circuit can be simplified through the control using the clock values counted by the counters COUNTM and COUNTS. Further, the overall accuracy of the operation is not greatly changed by process variation, achieving high reliability.

According to the configuration shown in FIG. 3, the output of the flip-flop FF4 is not used as it is for the switch control signal GD_S, but a logical product of the output of the flip-flop FF4 and an output of a flip-flop FF5 are used as the switch control signal GD_S. A zero current detection comparing signal ZCDOUT2 is supplied to a set terminal S of the flip-flop FF5. With an additional condition of the detection of a zero current in the slave-side inductor L2, the switch control signal GD_S is turned on. It is enough for the flip-flop FF5 to be reset together with the flip-flop FF4. When the switch control condition by the zero current detection comparing signal ZCDOUT2 is not added, a corresponding switch MOS transistor M2 may be turned on even if a current which flows in the inductor L2 is not zero. If so, the operation of the switch MOS transistor M2 will deviate from an operation in the critical mode. In such a case, all the currents made by the energy accumulated in the inductor L2 in advance are not used for a voltage step-up operation. That is, part of the currents will be wastefully discharged to the ground point GND through parasitic capacitance of the switching element M2, lowering the voltage step-up efficiency. In short, by adding the switch control condition by the zero current detection comparing signal ZCDOUT2, the operation in the critical mode is secured, achieving the highly efficient voltage step-up operation in which harmonic currents are suppressed.

The highest-order bit of the master cycle counter COUNTM is supplied to an OR gate OR1 of FIG. 2 as a restart signal RSTR and, in response to a count-up of the master cycle counter COUNTM, forcefully turns on the master switch control signal GD_M. Consequently, when starting the voltage step-up operation in the above critical mode, even in the case where the internal node is at an unstable level such as floating and the current in the inductor cannot easily be made zero, an occurrence of the state where a switch operation of the MOS transistor M1 cannot be started can be suppressed.

Figure 5:
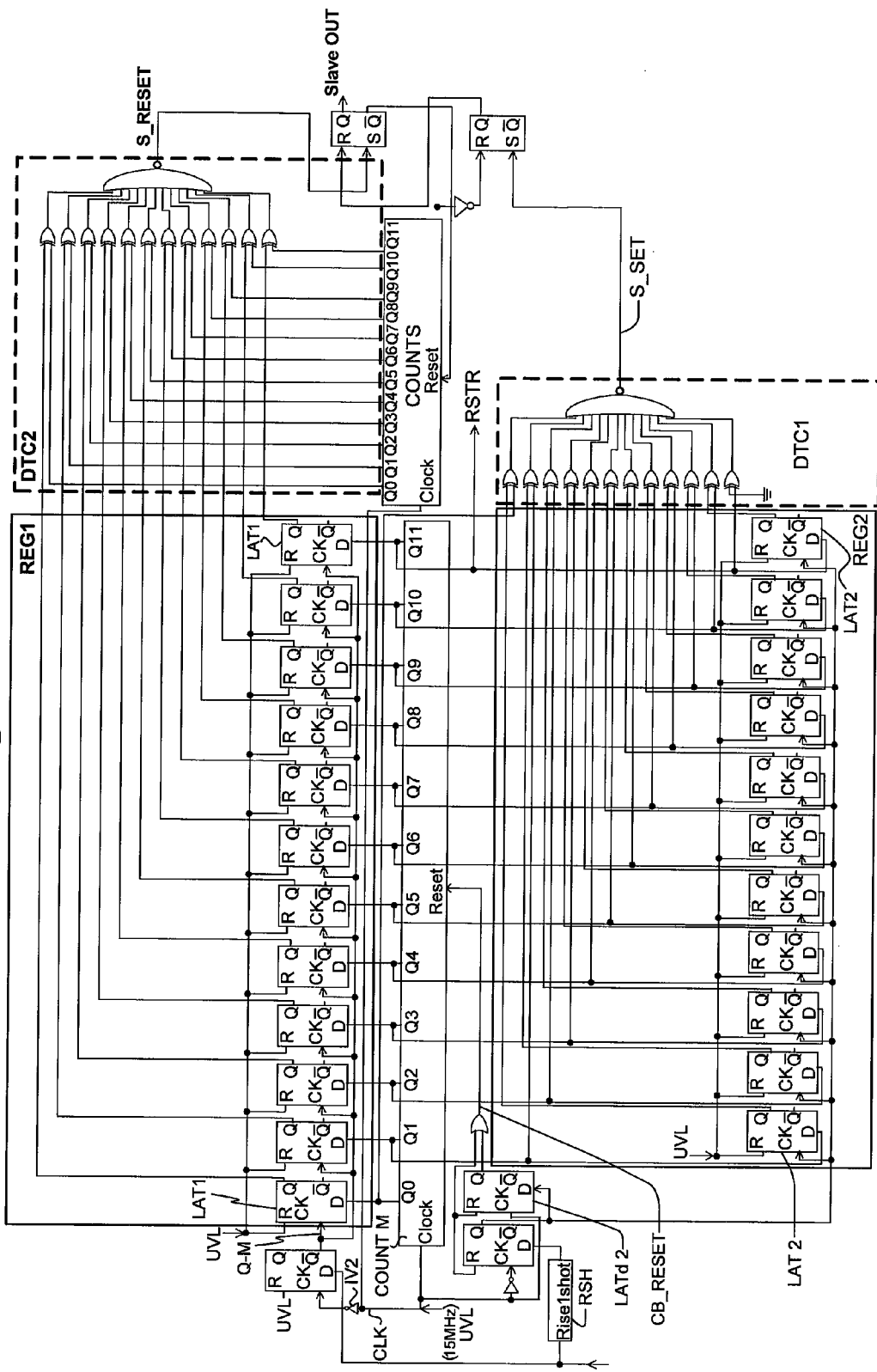
FIG. 5 is a logic block diagram which specifically illustrates the coupling state of a master on-time register REG1 and a master half-cycle register REG2 with respect to a master cycle counter.
Figure 6:
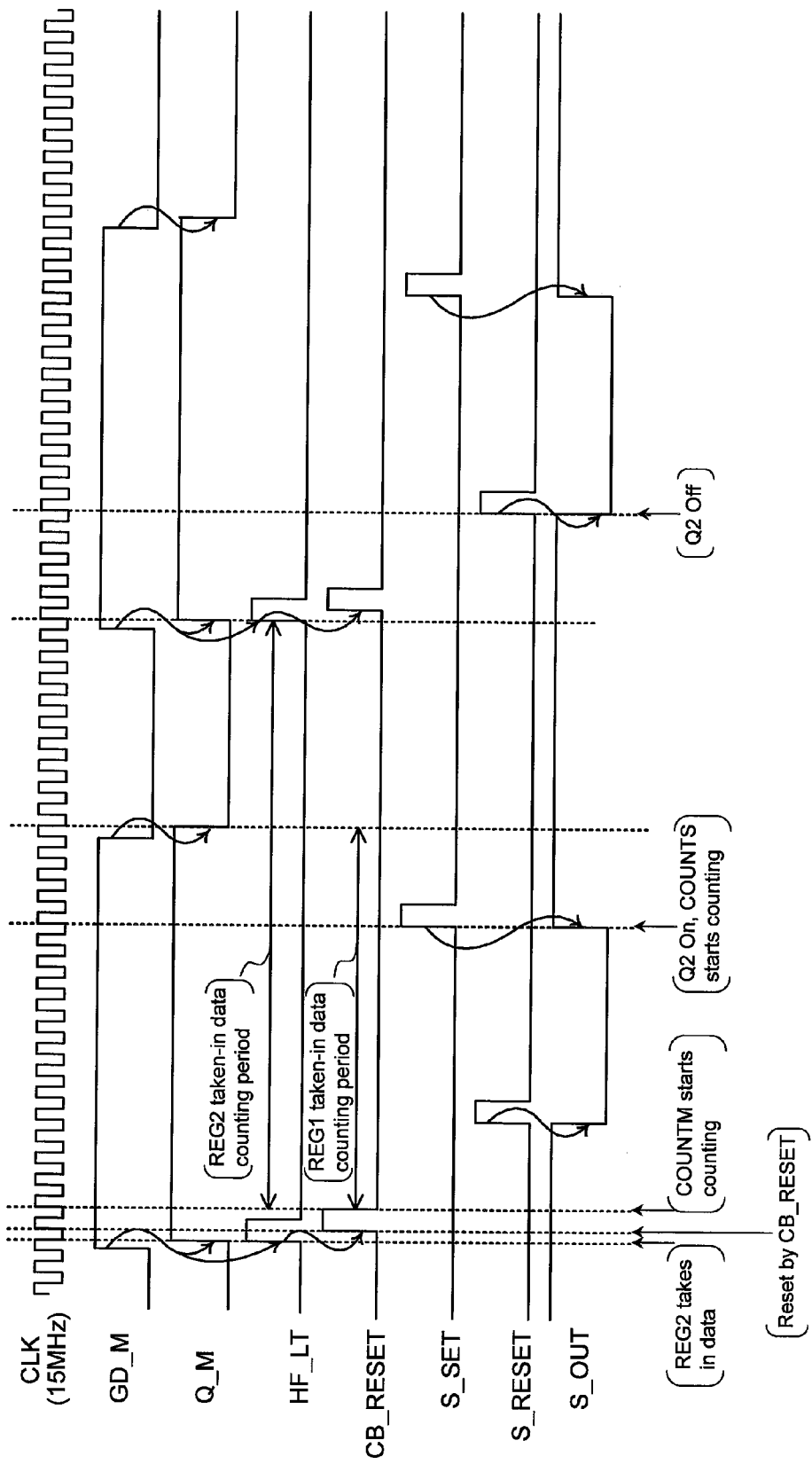
FIG. 6 is a timing chart which shows the timing of the operation of FIG. 5.

FIG. 5 specifically illustrates a coupling state of the master on-time register REG1 and the master half-cycle register REG2 with respect to the master cycle counter COUNTM. FIG. 6 shows operation timing of the case shown in FIG. 5. The delay circuit DEL of FIG. 3 comprises: a one-shot pulse generating circuit SHTG; an inverter IV1; and latch circuits LATd1 and LATd2. The latch circuits LATd1 and LATd2 are edge trigger type latch circuits which latch an input of a terminal D in synchronization with the startup edge of the clock terminal CK. The master cycle counter COUNTM comprises 12-bit binary counters of Q0 to Q11. It is initialized by a reset signal CB_RESET which is set to the high-level in synchronization with the startup of the count clock signal CLK. Further, the master cycle counter COUNTM starts counting in synchronization with the subsequent startup of the count clock signal CLK. The master half-cycle register REG2 comprises eleven edge trigger type latch circuits LAT2 corresponding to 11 bits of Q1 to Q11. In synchronization with the startup edge of the clock terminal CK, the latch circuit LAT2 latches the input of the terminal D. The latch circuit LAT2 inputs, to the clock input terminal CK, a latch pulse HF_LT outputted from the latch circuit LATd1 for each cycle of the master switch control signal GD_M. Further, the latch circuit LAT2 holds values (counted values of the half cycle) of the outputs Q1 to Q11 of the counter COUNTM which correspond to the one cycle for each cycle of the master switch control signal GD_M. The inverter INV of FIG. 3 comprises an inverter IV1 and a latch circuit LATh. The latch circuit LATh is an edge trigger type latch circuit which latches the input of the terminal D in synchronization with the startup edge of the clock terminal CK. The master on-time register REG1 comprises twelve edge trigger type latch circuits LAT1 corresponding to 12 bits of Q0 to Q11. The latch circuit LAT1 is an edge trigger type latch circuit which latches the input of the terminal D in synchronization with the startup edge of the clock terminal CK. By receiving an inverted output terminal/Q of the latch circuit LATh in the clock input terminal CK, the latch circuit LATh holds the counted value (counted value of an on-period) of the counter COUNTM in synchronization with falling of Q-M which is in synchronization with falling of the master switch control signal GD_M. In addition, a UVL is a general reset terminal for the slave logic circuit SLOG.

Figure 7:
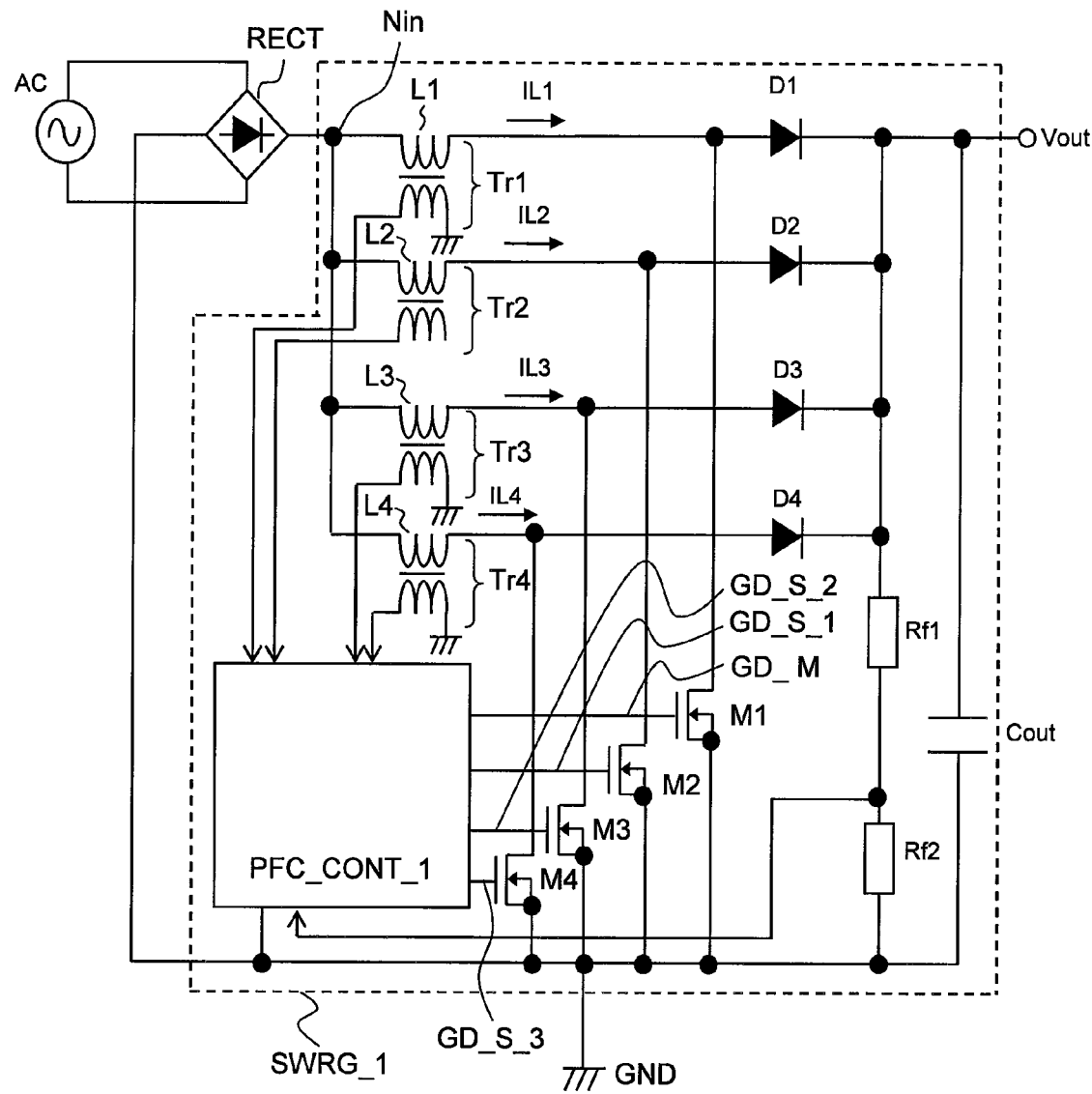
FIG. 7 is a circuit diagram of another power supply circuit adopting a switching regulator in which four chopper circuits are arranged in parallel.
Figure 8:
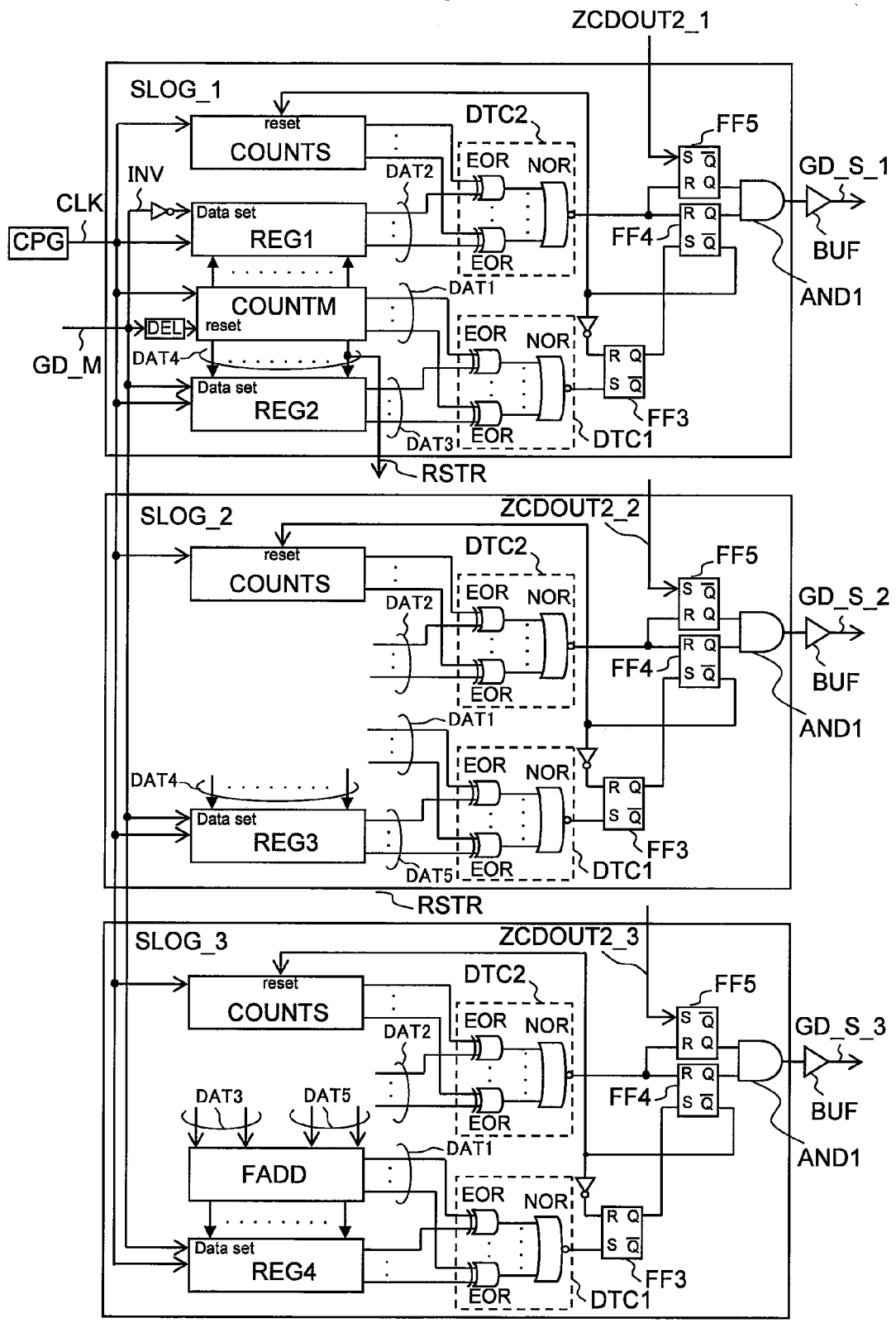
FIG. 8 is a block diagram of a slave logic adopted in the PFC controller of the switching regulator of FIG. 7.

FIG. 7 illustrates another switching regulator SWRG_1. It differs from the switching regulator shown in FIG. 1 in that there are one master voltage step-up chopper circuit and three slave voltage step-up chopper circuits provided in parallel between the input terminal Nin and the output-terminal Vout. L1 to L4 are inductors, D1 to D4 are diodes, Tr1 to Tr4 are transformers, M1 to M4 are switch MOS transistors, GD_S_1 to GD_S_3 are switch control signals of the switch MOS transistors M2 to M4, and PFC_CONT_1 is a PFC controller. The PFC controller PFC_CONT_1 has the same first circuit CONT1 as in FIG. 2. Although not particularly shown, the second circuit CONT2 has a slave logic SLOG whose configuration is different from the one in FIG. 2. That is, as shown in FIG. 8, the slave logic comprises logics SLOG1 to SLOG3. The configuration of the logic SLOG_1 is the same as in FIG. 3. As compared to the one in FIG. 3, the master-on time counter REG1 and the master cycle counter COUNTM are eliminated from the logic SLOG_2. Further, the master half-cycle register REG2 is replaced with a master ¼ cycle register REG3. The detector DTC1 receives a counted value DAT1 from the master cycle counter COUNTM, and the detector DTC2 receives latch data DAT2 from the master on-time register REG1. The master ¼ cycle register REG3 receives the counted values (Q2 to Q11) of ¼ cycle from the output DAT4 of the master cycle counter COUNTM. As a result, with respect to the master switch control signal GD_M, the logic SLOG_2 can output a switch control signal GD_S_2 having a phase delayed by ¼ cycle and of the same waveform. As compared to the one in FIG. 3, the master on-time register REG1 and the master cycle counter COUNTM are eliminated from the logic SLOG_3. The master half-cycle register REG2 is replaced with a ¾ cycle register REG4 and a full-adder FADD. The detector DTC1 receives a counted value DAT1 from the master cycle counter COUNTM, and the detector DTC2 receives latch data DAT2 from the master on-time register REG1. The full-adder FADD inputs and full-adds the counted value data DAT3 of ½ cycle held in the master half-cycle register REG2 and the counted value data DAT4 of ¼ cycle held in the master ¼ cycle register REG3. The addition result becomes a counted value of a ¾ cycle and is held in the ¾ cycle register REG4. As a result, with respect to the master switch control signal GD_M, the logic SLOG_3 can output a switch control signal GD_S_3 having a phase delayed by ¾ cycle and of the same waveform.

As typically shown in FIG. 7, when the number of voltage step-up chopper circuits provided in parallel between the input terminal Nin and the output terminal Vout is increased, the logic scale of the PFC controller increases. In accordance with it, the phase of a current peak which flows in each inductor is shifted and the peak current becomes smaller, further suppressing an occurrence of harmonic current.

Figure 9:
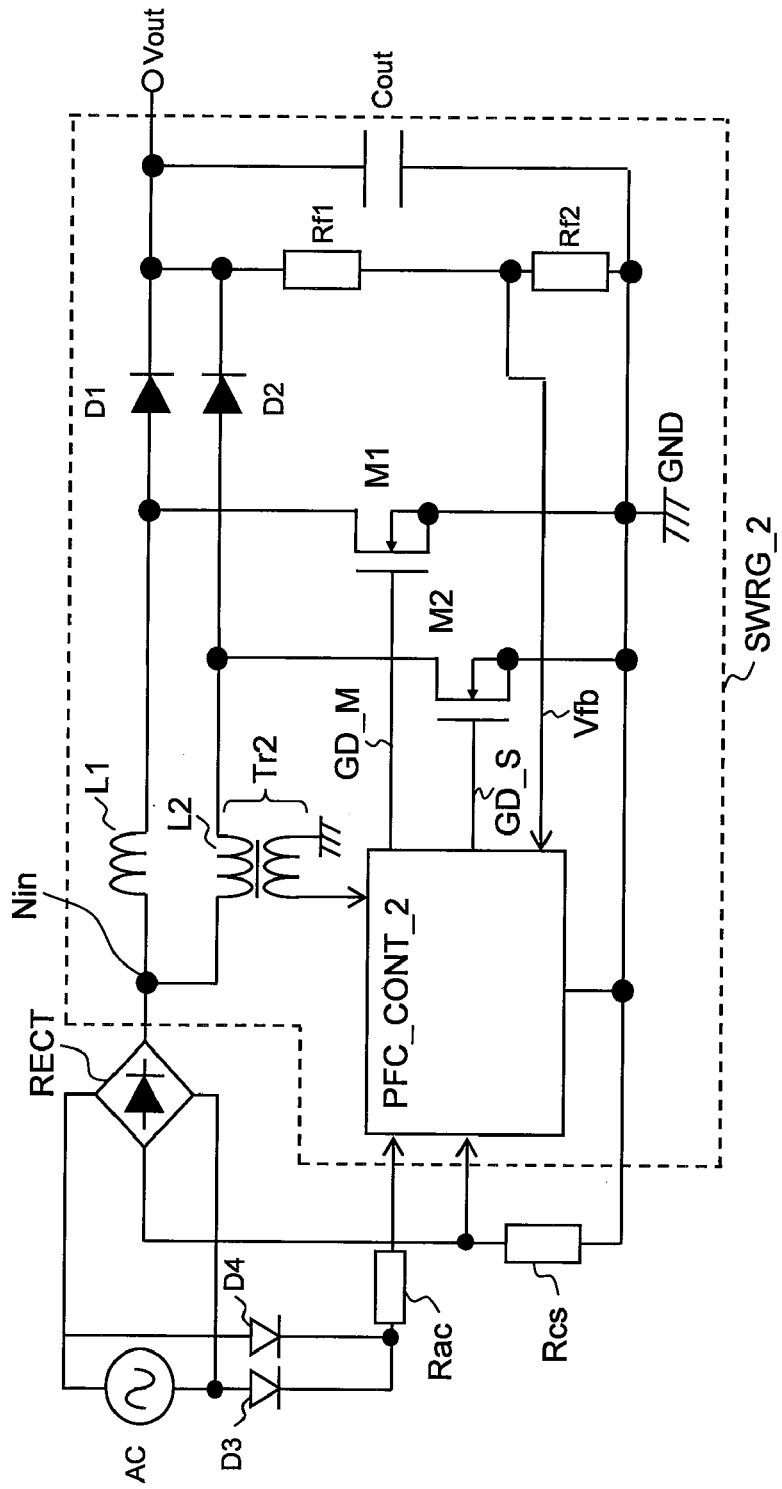
FIG. 9 is a circuit diagram which illustrates a power supply circuit operated in a continuous mode.

FIG. 9 shows an example of a power supply circuit operated in a continuous mode. A PFC_CONT_2 is a PFC controller which is compliant to the continuous mode. In compliance with the continuous mode, registers Rac and Rcs as well as diodes D3 and D4 are attached as external elements.

Figure 10:
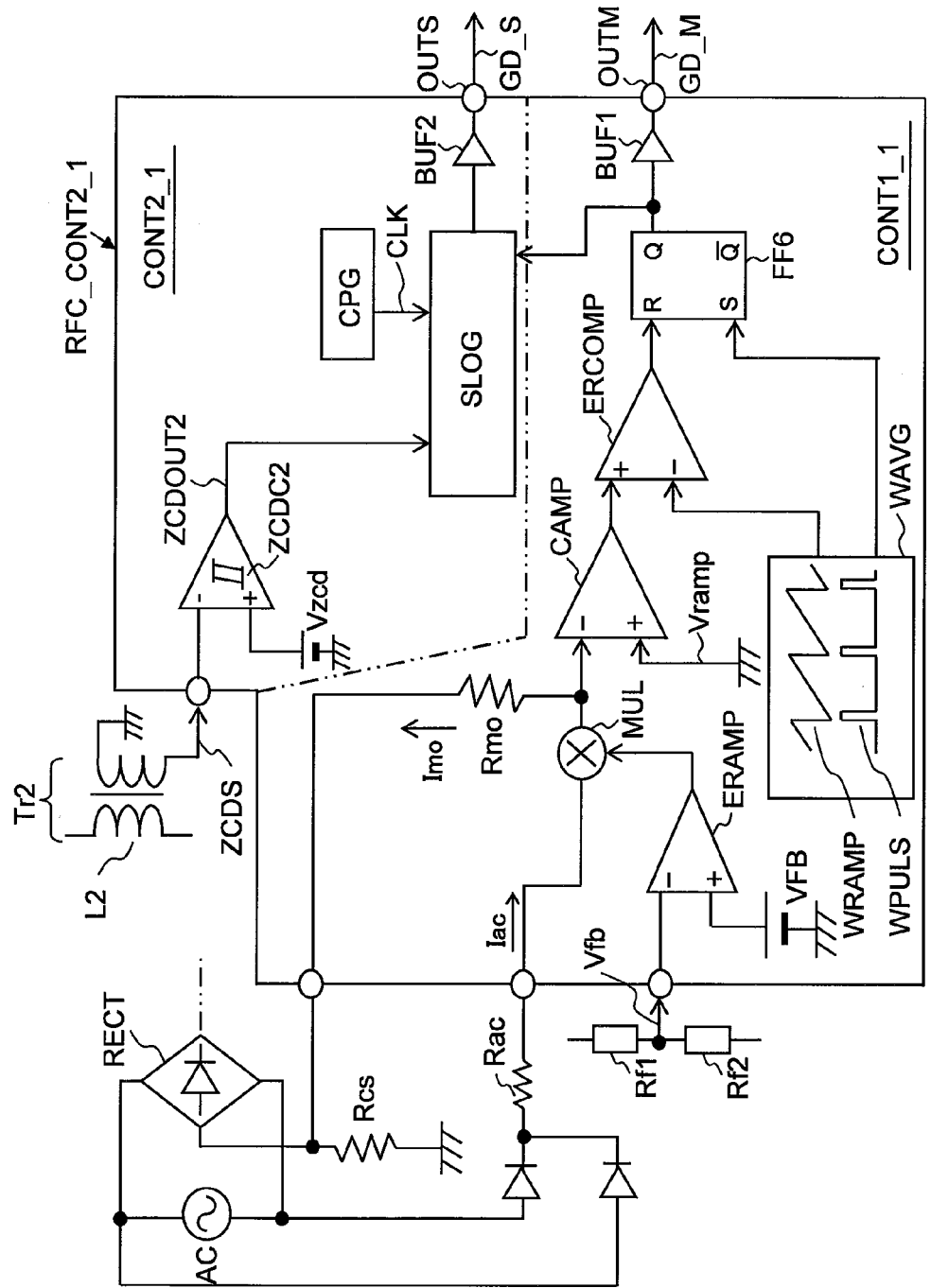
FIG. 10 is a circuit diagram showing a general configuration of a PFC controller adopted in the power supply circuit of FIG. 9.

FIG. 10 shows an example of the PFC controller PFC_CONT_2. In the first circuit CONT1_1, a multiplier MUL multiplies input voltage information of an AC power supply AC converted to current information IAC by diodes D3 and D4 and the resistor Rac by the output of the error amplifier ERAMP corresponding to a feedback voltage Vfb. The output of the multiplier MUL is coupled to the inverted input terminal of the current amplifier CAMP. The inverted input terminal is coupled to the current-detecting resistor Rcs through a resistor Rmo. Consequently, a feedback is applied to a current amplifier CAMP by the current Imo which flows in the resistor Rmo through the current-detecting resistor Rcs. That is, the current of the inverted input terminal of the current amplifier CAMP is controlled so that the voltage waveform of the resistor Rcs becomes equivalent to that of the voltage of the AC power supply AC. The comparator ERCOMP compares an output voltage of the current amplifier CAMP with a ramp voltage Vramp of a ramp waveform (WRAMP) outputted from an oscillator WAVG, and the on-duty of the switch control signal GD_M is determined. A flip-flop FF6 is set by a signal of the pulse waveform (WPULS) generated according to a fall of the ramp waveform RAMP, thereby the switch control signal GD_M is turned on. In the continuous mode, the frequency of the switch control signal GD_M is fixed. The second circuit CONT2_1 receives the switch control signal GD_M and, as described earlier, generates the switch control signal GD_S of the switch MOS transistor M2. In the continuous mode, since the oscillator WAVG is used, the restart signal RSTR is not necessary.

The present invention has been described above practically with reference to the preferred embodiments, but the present invention is not limited to the above embodiments and allows various changes or modifications within the scope not departing from the claims. For example, the number of chopper circuits arranged in parallel is not be limited to two or four, and it may be eight or more. Further, the specific configuration of using the counter and register in the PFC controller is not limited to the one in FIG. 5, and it may be changed suitably.

INDUSTRIAL APPLICABILITY

The present invention is widely applicable to switch regulators and power supply circuits.

What is claimed is:

1. A PFC controller which controls switching elements of a plurality of voltage step-up chopper circuits arranged in parallel between an input terminal and an output terminal, comprising:
a first circuit which generates one of switch control signals for one of said switching elements in one of said voltage step-up chopper circuits; and
a second circuit which generates other switch control signals whose phases are shifted from a phase of said one of the switch control signals for said other switching elements in said other voltage step-up chopper circuits,
wherein said second circuit includes:
a first counter which counts clock signals by a cycle unit of said one of the switch control signals;
a second counter which counts clock signals by a cycle unit having a phase shifted from that of said one of the switch control signals by a predetermined phase difference; and
a first register which holds a value counted by said first counter corresponding to a period of a first-level state of said one of the switch control signals, and
wherein said other switch control signal turns on the other switching element when said second counter starts counting and turns off said other switching element with a timing in which the value counted by said second counter matches the value held in said first register.

2. A PFC controller according to claim 1, wherein said first circuit generates said one of the switch control signals such that an on-period and turn-on timing of said one of the switching element are determined according to a state of a stepped-up voltage obtained at said output terminal.

3. A PFC controller according to claim 2, wherein said first circuit generates said one of the switch control signals such that the on-period of said one of the switching elements becomes shorter as the stepped-up voltage obtained at said output terminal comes closer to a target level and that the turn-on timing of said one of the switching elements is determined in response to detection of a zero current of an inductor in a voltage step-up chopper circuit corresponding to said one of the switching elements.

4. A PFC controller according to claim 3, wherein said second circuit performs a turn-on control of said other switching element with an additional condition of detecting the zero current of the inductor in the voltage step-up chopper circuit corresponding to said other switching element.

5. A PFC controller according to claim 3, wherein said first circuit forcefully turns on said one of the switching elements in response to a count-up of said first counter in said second circuit.

6. A PFC controller according to claim 1,
wherein said second circuit further comprises: a second register which holds a value counted by said first counter in response to a predetermined phase difference to said one of the switch control signals; a first detector which detects timing in which the value counted by said first counter matches the value held in said second register; and a second detector which detects timing in which the value counted by said second counter matches the value held in said first register,
wherein said second counter counts said clock signals from an initial value for each detection timing by said first detector, and
wherein said second circuit turns on the other switching element with the match timing by said first detector and turns off the other switching element with the match timing by the second detector.

7. A PFC controller according to claim 1,
wherein the PFC controller is used for a switch control of two voltage step-up chopper circuits arranged in parallel, and
wherein said second circuit comprises a set of said second counters as well as a set of said first counter and said first register.

8. A PFC controller according to claim 1,
wherein the PFC controller is used for a switching control of four voltage step-up chopper circuits arranged in parallel,
wherein said one of the switching elements is a single switching element and said other switching elements are three switching elements,
wherein said second circuit comprises three sets of the second counters as well as a set of said first counter and said first register, and
wherein said second counters count clock signals by cycle units having respective different predetermined phase differences with respect to said one of the switch control signals, turn on said corresponding other switching element when the second counter starts counting, and turn off the corresponding other switching element with the timing in which the value counted by the second counter matches the value held in the first register.

9. A switching regulator comprising:
a plurality of series circuits of inductors and diodes arranged in parallel between an input terminal which receives an output of a rectifier circuit and an output terminal, steps up a voltage at said input terminal and outputs it to said output terminal by driving a plurality of switching elements coupled to the connection node of respective inductors and diodes by different phases; and
a PFC controller which controls said switching elements,
wherein said PFC controller includes:
a first circuit which generates one of switch control signals for one of switching elements; and
a second circuit which generates the other switch control signal whose phase is shifted from that of said one of the switching elements for the other switching element of said switching elements,
wherein said second circuit includes:
a first counter which counts clock signals by a cycle unit of said one of the switch control signals;
a second counter which counts clock signals by a cycle unit whose phase is shifted from that of said one of the switch control signals by a predetermined phase difference; and
a first register which holds a value counted by said first counter corresponding to a period of a first-level state of said one of the switch control signals, and
wherein said other switch control signal turns on the other switching element when said second counter starts counting and turns off said other switching element with a timing in which the value counted by said second counter matches the value held in said first register.

10. A switching regulator according to claim 9, wherein said first circuit generates said one of the switch control signals so as to determine an on-period and turn-on timing of said one of the switching elements in accordance with a state of a stepped-up voltage formed by said switching regulator.

11. A switching regulator according to claim 10,
wherein said first circuit generates said one of the switch control signals such that the on-period of said one of the switching elements becomes shorter as a stepped-up voltage formed by said switching regulator comes closer to a target level and that the turn-on timing of said one of the switching elements is determined in response to detection of a zero current in an inductor corresponding to said one of the switching elements.

12. A PFC controller according to claim 11, wherein said second circuit performs a turn-on control of said other switching element with an additional condition of detecting a zero current in an inductor corresponding to said other switching element.

13. A PFC controller according to claim 11, wherein said first circuit forcefully turns on said one of the switching elements in response to a count-up of said first counter in said second circuit.

14. A switching regulator according to claim 9,
wherein the second circuit further comprises: a second register which holds a value counted by said first counter in response to a predetermined phase difference with respect to said one of the switch control signals; a first detector which detects timing in which the value counted by said first counter matches a value held in said second register; and a second detector which detects timing in which the value counted by said second counter matches the value held in said first register,
wherein said second counter counts said clocks from an initial value for each detection timing by said first detection circuit, and wherein said second circuit turns on the other switching element with match timing by said first detector and turn off the other switching element with match timing by the second detector.

15. A switching regulator according to claim 14, comprising two series circuits of inductors and diodes arranged in parallel and two switching elements coupled to the connection node of respective inductors and diodes, and stepping up a voltage of said input terminal to output to the output terminal when the two switching elements are driven by different phases,
wherein said second circuit comprises a set of the second counter and first and second detectors of the second register as well as a set of said first counter and said first register.

16. A switching regulator according to claim 14, comprising four series circuits of inductors and diodes arranged in parallel and four switching elements coupled to the connection node of respective inductors and diodes, and stepping up a voltage of said input terminal to output to the output terminal when the four switching elements are driven by different phases,
wherein said one of the switching elements is a single switching element and said other switching elements are three switching elements,
wherein said second circuit comprises three sets of said second counter and first and second detectors of the second register as well as a set of said first counter and said first register, and
wherein said second counters count clock signals by cycle units having respective different predetermined phase differences with respect to said one of the switch control signals.

17. A power supply circuit comprising:
a rectifier circuit which performs rectifying upon receipt of an AC power supply;
an input terminal which receives an output of said rectifier circuit; an output terminal;
a plurality of series circuits of inductors and diodes coupled in parallel between said input terminal and said output terminal;
a plurality of switching elements coupled to a connection node of respective inductors and diodes; and
a controller which steps up a voltage of said input terminal and outputs it to said output terminal by controlling said respective switching elements by different phases,
wherein said controller includes:
a first circuit which generates a first switch control signal for said first switching element; and
a second circuit which generates the other switch control signal whose phase is shifted from that of the switch control signal generated in said first circuit for the other switching element among said switching elements,
wherein the second circuit includes:
a first counter which counts clock signals by a cycle unit of said first switch control signal;
a first register which holds a value counted by said first counter corresponding to a period of a first-level state of said one of the switch control signals;
a second register which holds a value counted by said first counter in response to a predetermined phase difference with respect to said one of the switch control signals;
a first detector which detects timing in which the value counted by said first counter matches the value held in the second register;
a second counter which counts said clocks signals from an initial value for each detection timing by the first detector; and
a second detector which detects timing in which the value counted by the second counter matches the value held in the first register, and
wherein the second circuit turns on the other switching element with the match timing by the first detector and turns off the other switching element with the match timing by the second detector.

18. A power supply circuit according to claim 17, wherein said first circuit generates said one of the switch control signal so as to determine an on-period and a turn-on timing of said one of the switching elements according to a state of said stepped-up voltage.

19. A power supply circuit according to claim 18, wherein said first circuit generates said one of the switch control signals such that the on-period of one of the switching elements becomes shorter as said stepped-up voltage comes closer to a target level and that, in response to detection of a zero current in an inductor corresponding to said one of the switching element, the turn-on timing of said one of the switching element is determined.

20. A PFC controller according to claim 19, wherein said second circuit turns on said other switching element with an additional condition of detecting a zero current in an inductor corresponding to said other switching element.

21. A PFC controller according to claim 19, wherein said first circuit forcefully turns on said one of the switching elements in response to a count-up of said first counter in said second circuit.

* * * * *